(12) United States Patent
Doan et al.

(10) Patent No.: US 10,387,388 B2
(45) Date of Patent: Aug. 20, 2019

(54) DATABASE SCHEMA FOR EFFICIENT DATA ASSESSMENT

(71) Applicant: salesforce.com, inc., San Francisco, CA (US)

(72) Inventors: Dai Duong Doan, Alameda, CA (US); Parth Vaishnav, Cupertino, CA (US); Danil Dvinov, Oakland, CA (US); Chenghung Ker, Burlingame, CA (US)

(73) Assignee: salesforce.com, inc., San Francisco, CA (US)

( * ) Notice: Subject to any disclaimer, the term of this patent is extended or adjusted under 35 U.S.C. 154(b) by 132 days.

(21) Appl. No.: 15/438,434

(22) Filed: Feb. 21, 2017

(65) Prior Publication Data

US 2018/0189330 A1 Jul. 5, 2018

Related U.S. Application Data

(63) Continuation-in-part of application No. 15/397,824, filed on Jan. 4, 2017.

(51) Int. Cl.
*G06F 17/30* (2006.01)
*G06F 16/21* (2019.01)
*G06F 16/22* (2019.01)

(52) U.S. Cl.
CPC ........ *G06F 16/211* (2019.01); *G06F 16/2282* (2019.01)

(58) Field of Classification Search
CPC ......... G06F 17/30292; G06F 17/30339; G06F 16/211; G06F 16/2282
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |

(Continued)

OTHER PUBLICATIONS

U.S. Appl. No. 13/986,251, filed Apr. 16, 2013.

*Primary Examiner* — Alicia M Willoughby
(74) *Attorney, Agent, or Firm* — Dergosits & Noah LLP; Todd A. Noah

(57) ABSTRACT

A computing system may create a database schema representing tables for data assessment, organization identification (ID), rule ID, data source ID, and data assessment ID. The data assessment table may include a first field representing an organization ID, a second field representing a rule ID, a third field representing a data source ID, wherein the fields correspond to a records in the organization ID table, rule ID table and data source ID table, respectively. The data assessment table may also include a fourth field representing a match status indicating whether a record in data assessment ID table matches a record of a data source associated with the third field, a fifth field representing a data assessment record ID and corresponding to a record in data assessment record ID table, and a sixth field configured as a column family and representing a field of the business object.

33 Claims, 15 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0095549 A1* | 4/2014 | Shi .................. G06F 17/30292 707/803 |
| 2014/0172833 A1* | 6/2014 | Taylor ............... G06F 17/30448 707/722 |
| 2014/0258316 A1* | 9/2014 | O'Hagan .......... G06F 17/30557 707/756 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2016/0224594 A1* | 8/2016 | Chow ............... G06F 17/30292 |
| 2017/0161341 A1* | 6/2017 | Hrabovsky ....... G06F 17/30289 |
| 2018/0113898 A1* | 4/2018 | Hall .................. G06F 17/30303 |

* cited by examiner

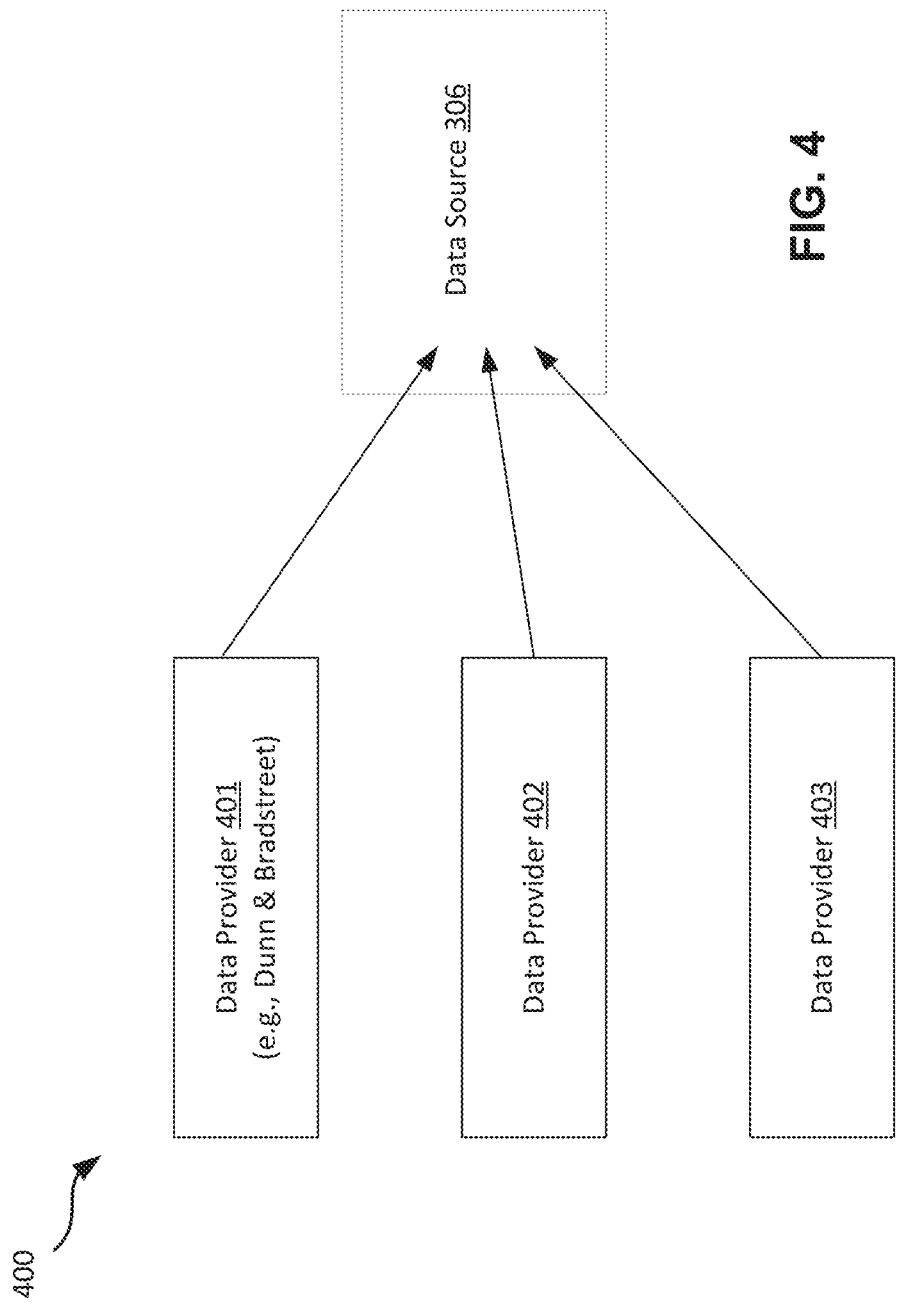

697

```
CREATE TABLE IF NOT EXISTS DATACLOUD.DATA_ASSESSMENT_RECORD
  (
    ORGANIZATION_ID char(15) not null,
    JOURNEY_ID char(15) not null,
    DATASOURCE SMALLINT not null,
    MATCH_STATUS TINYINT not null,
    EXTERNAL_DATASOURCE_KEY varchar(30),
    ENTITY_ID char(15) not null,
    DATA_ASSESSMENT_RECORD_ID char(15),
    SYSMODSTAMP TIMESTAMP,
    "av"."_" char(1),
    "rv"."_" char(1),
    "fd"."_" char(1),
    CONSTRAINT PK PRIMARY KEY (
        ORGANIZATION_ID,
        JOURNEY_ID,
        DATASOURCE,
        MATCH_STATUS,
      EXTERNAL_DATASOURCE_KEY,
        ENTITY_ID
    )
  ) VERSIONS=1,MULTI_TENANT=true,REPLICATION_SCOPE=1
```

SELECT JOURNEY_ID, DATASOURCE,
MATCH_STATUS, ENTITY_ID,
EXTERNAL_DATASOURCE_KEY, SYSMODSTAMP,
"av"."Sic" AS av_Sic, "av"."Geography" AS av_Geography,
"av"."AnnualRevenue" AS av_AnnualRevenue,
"av"."NumberOfEmployees" AS av_NumberOfEmployees,
"av"."DelinquencyRisk" AS av_DelinquencyRisk,
"rv"."RawField1" AS rv_RawField1, "rv"."RawField2" AS
rv_RawField2, "fd"."Name" AS fd_Name, "fd"."BillingStreet"
AS fd_BillingStreet, "fd"."BillingCity" AS fd_BillingCity,
"fd"."Phone" AS fd_Phone, "fd"."Sic" AS fd_Sic FROM
DATACLOUD.DATA_ASSESSMENT_RECORD("av"."Sic"
VARCHAR, "av"."Geography" VARCHAR,
"av"."AnnualRevenue" VARCHAR,
"av"."NumberOfEmployees" VARCHAR,
"av"."DelinquencyRisk" VARCHAR, "rv"."RawField1"
VARCHAR, "rv"."RawField2" VARCHAR, "fd"."Name"
TINYINT, "fd"."BillingStreet" TINYINT, "fd"."BillingCity"
TINYINT, "fd"."Phone" TINYINT, "fd"."Sic" TINYINT)
WHERE JOURNEY_ID='000000000000000' AND
DATASOURCE=0 AND MATCH_STATUS=0 LIMIT 1000

FIG. 6D

DATABASE SCHEMA FOR EFFICIENT DATA ASSESSMENT

CLAIM OF PRIORITY

This application is a continuation-in-part application of U.S. application Ser. No. 15/397,824, filed Jan. 4, 2017, which is incorporated in its entirety herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to database schema.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Customer Relationship Management (CRM) is a strategy for managing a company's relationships and interactions with its customers and potential customers. A CRM system helps a company grow because it tracks the history of customer interactions from calls made and emails sent, to meetings held, presentations delivered, and steps needed to close the deal or grow that customer account. To run smoothly, a company needs customer relationship data that is up to date. However, because the customer relationship data may change frequently (e.g., job change, contact information change, etc.), the customer relationship data can be outdated. When the customer relationship data is out of dated, contacts may be lost, customer relationship may be negatively impacted and business growth may be affected.

BRIEF SUMMARY

For some embodiments, methods and systems for creating a database schema to perform data assessment, the method comprising creating, by a server computing system, a database schema representing a data assessment table, an organization identification (ID) table, a rule ID table, a data source ID table, and a data assessment ID table, wherein the data assessment table is configured to include multiple fields in specific order, the multiple fields include at least: a first field representing an organization ID and corresponding to a record in the organization ID table; at least one second field representing a rule ID and corresponding to a record in the rule ID table, each record in the rule ID table associated with a business object and indicating a rule to be used by a data assessment application to perform the data assessment; at least one third field representing a data source ID and corresponding to a record in the data source ID table, each record in the data source ID table identifying a data source; a fourth field representing a match status to indicate whether a record in the data assessment ID table matches with a record of a data source associated with the third field; a fifth field representing a data assessment record ID and corresponding to a record in the data assessment record ID table, each record in the data assessment record ID table being a record to be assessed; and at least one sixth field configured as a column family and representing a field of the business object, wherein the field of the business object is to be determined at run time by the data assessment application, and wherein the database schema is associated with a non-relational distributed database. Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

FIG. 4 is a diagram that shows an example of a data source, in accordance with some embodiments

FIG. 6C shows an example code that may be used to create a data assessment table such as the data assessment table 645 of FIG. 6B, in accordance with some embodiments.

FIG. 6D shows an example code that may be used to query a data assessment table such as the data assessment table 645 of FIG. 6B, in accordance with some embodiments.

DETAILED DESCRIPTION

Figure 1:
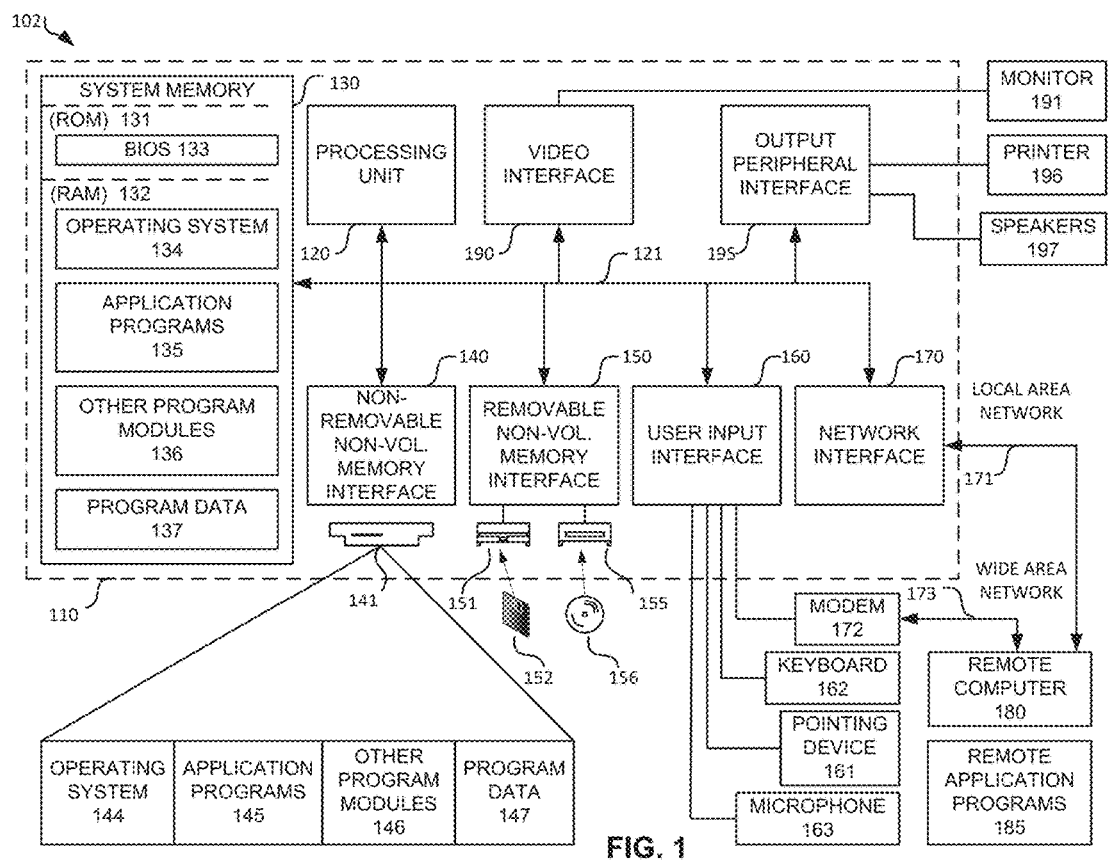
FIG. 1 shows a diagram of an example computing system that may be used with some embodiments.

Applications of systems and methods for creating a database schema that may be used for performing data assessment are disclosed. A data schema may be created to include a data assessment table configured to include an organization ID field, a rule ID field, a data source ID field, and a column family field. The column family field may be associated with a field of a business object. There may be multiple rule ID fields, multiple data source ID fields, and multiple column family fields. A business object field associated with a column family field may be determined at run time. The data schema is to accommodate data in different shapes as well changes to the data from one shape to another shape.

The systems and methods will be described with reference to example embodiments. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include systems and methods for creating a database schema used for performing data assessment. The method includes creating, by a server computing system, a database schema representing a data assessment table, an organization identification (ID) table, a rule ID table, a data source ID table, and a data assessment ID table, wherein the data assessment table is configured to include multiple fields in specific order, the multiple fields include at least: a first field representing an organization ID and corresponding to a record in the organization ID table; at least one second field representing a rule ID and corresponding to a record in the rule ID table, each record in the rule ID table associated with a business object and indicating a rule to be used by a data assessment application to perform the data assessment; at least one third field representing a data source ID and corresponding to a record in the data source ID table, each record in the data source ID table identifying a data source; a fourth field representing a match status to indicate whether a record in the data assessment ID table matches with a record of a data source associated with the third field; a fifth field representing a data assessment record ID and corresponding to a record in the data assessment record ID table, each record in the data assessment record ID table being a record to be assessed; and at least one sixth field configured as a column family and representing a field of the business object, wherein the field of the business object is to be determined at run time by the data assessment application, and wherein the database schema is associated with a non-relational distributed database.

The disclosed embodiments may include an apparatus for creating a database schema used for performing data assessment and include a processor, and one or more stored sequences of instructions which, when executed by the processor, cause the processor to create a database schema representing a data assessment table, an organization identification (ID) table, a rule ID table, a data source ID table, and a data assessment ID table, wherein the data assessment table is configured to include multiple fields in specific order, the multiple fields include at least: a first field representing an organization ID and corresponding to a record in the organization ID table; at least one second field representing a rule ID and corresponding to a record in the rule ID table, each record in the rule ID table associated with a business object and indicating a rule to be used by a data assessment application to perform the data assessment; at least one third field representing a data source ID and corresponding to a record in the data source ID table, each record in the data source ID table identifying a data source; a fourth field representing a match status to indicate whether a record in the data assessment ID table matches with a record of a data source associated with the third field; a fifth field representing a data assessment record ID and corresponding to a record in the data assessment record ID table, each record in the data assessment record ID table being a record to be assessed; and at least one sixth field configured as a column family and representing a field of the business object, wherein the field of the business object is to be determined at run time by the data assessment application, and wherein the database schema is associated with a non-relational distributed database.

The disclosed embodiments may include a computer program product comprising computer-readable program code to be executed by one or more processors when retrieved from a non-transitory computer-readable medium, the program code including instructions to create a database schema representing a data assessment table, an organization identification (ID) table, a rule ID table, a data source ID table, and a data assessment ID table, wherein the data assessment table is configured to include multiple fields in specific order, the multiple fields include at least: a first field representing an organization ID and corresponding to a record in the organization ID table; at least one second field representing a rule ID and corresponding to a record in the rule ID table, each record in the rule ID table associated with a business object and indicating a rule to be used by a data assessment application to perform the data assessment; at least one third field representing a data source ID and corresponding to a record in the data source ID table, each record in the data source ID table identifying a data source; a fourth field representing a match status to indicate whether a record in the data assessment ID table matches with a record of a data source associated with the third field; a fifth field representing a data assessment record ID and corresponding to a record in the data assessment record ID table, each record in the data assessment record ID table being a record to be assessed; and at least one sixth field configured as a column family and representing a field of the business object, wherein the field of the business object is to be determined at run time by the data assessment application, and wherein the database schema is associated with a non-relational distributed database.

While one or more implementations and techniques are described with reference to an embodiment in which data may be assessed using a database schema and based on one or more data sources is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is a diagram of an example computing system that may be used with some embodiments of the present invention. The computing system 102 may be used by a user to log in to an application and initiate a request to perform a data assessment. For example, the user may be an administrator who may be interested in assessing the data associated with an entity. The administrator may be presented with a user interface to initiate the request. The request may be sent to a server computing system configured to perform the assessment of the entity's data based on a data source. The server computing system may respond to the request by providing an assessment result. The assessment result may include information that may enable the administrator to have a view of the quality of the entity's data. For some embodiments, the server computing system may be associated with a multi-tenant database environment. For example, the multi-tenant database environment may be associated with the services provided by Salesforce.com®.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer program product. Computer program product can be any available media that can be accessed by computing system 102 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102.

FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
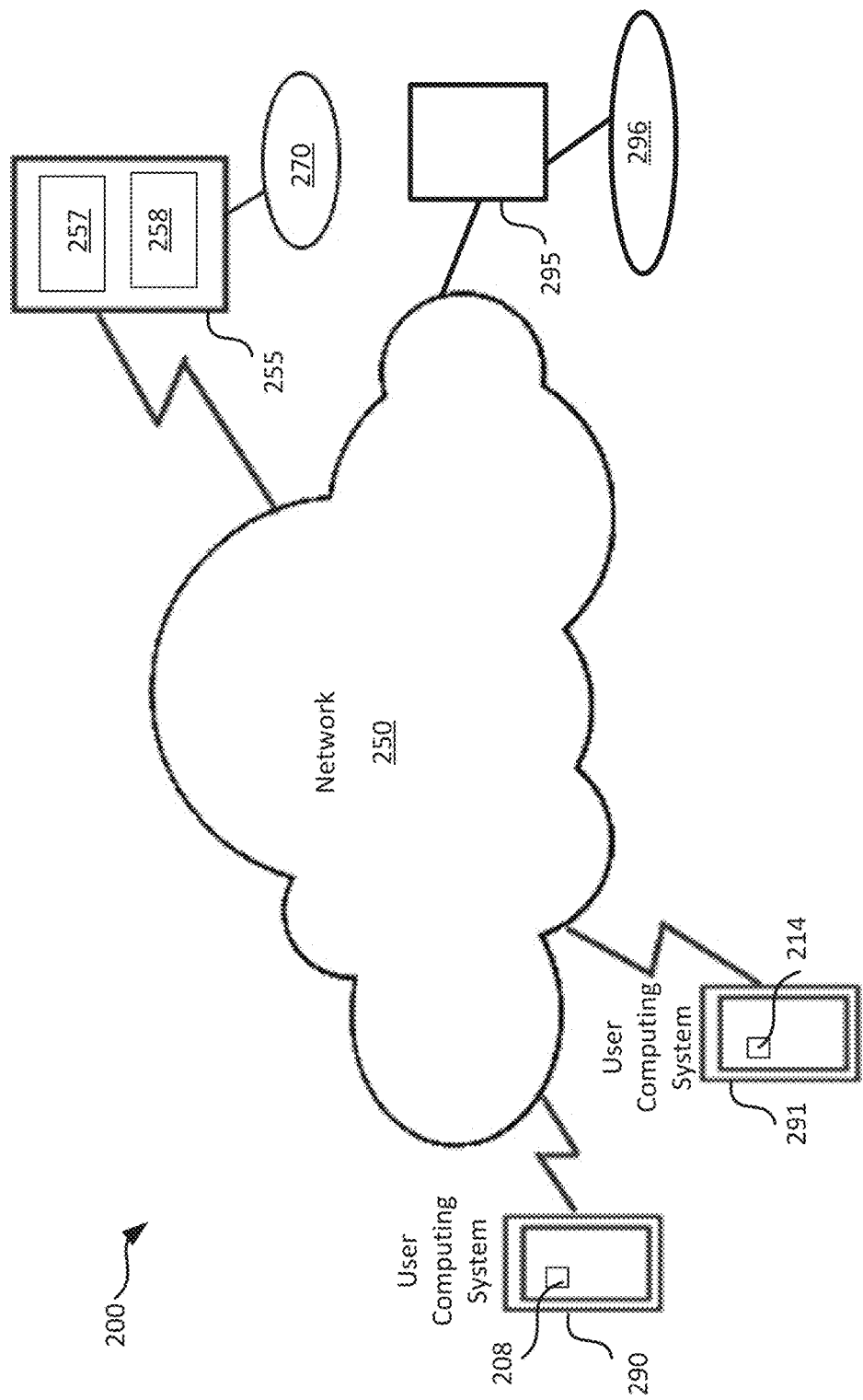
FIG. 2 shows a diagram of an example network environment that may be used with some embodiments.

FIG. 2 shows a diagram of an example network environment that may be used with some embodiments of the present invention. Network environment 200 includes user computing systems 290 and 291. One or more of the user computing systems 290 and 291 may be a mobile computing system. The user computing systems 290 and 291 may be connected to the network 250 via a cellular connection or via a Wi-Fi router (not shown). The network 250 may be the Internet. The user computing systems 290 and 291 may be coupled with server computing system 255 via the network 250.

Each of the user computing systems 290 and 291 may include a respective application module 208 and 214. A user may use the computing system 290 and the application module 208 to connect to and communicate with the server computing system 255 and log into application 257 (e.g., a Salesforce.com® application). For example, once the user is logged in, the user may initiate a request to perform a data assessment. The data assessment may be performed by the data assessment application 258. The server computing system 255 may be coupled with database 270. The database 270 may be configured to store the data to be assessed. The server computing system 255 may be associated with an entity (e.g., Salesforce.com®).

For some embodiments, the server computing system 255 may be coupled with server computing system 295 (also referred to as data source server 295). The data source server 295 may be coupled with a database 296 configured to store a data source. The data source may include data provided by one or more data providers. One example of such a data provider is Dunn & Bradstreet specialized in providing company profiles. For some embodiment, when a request for data assessment is initiated, the request and the data to be assessed may be transmitted from the server computing system 255 to the data source server 295 for assessment.

Figure 3:
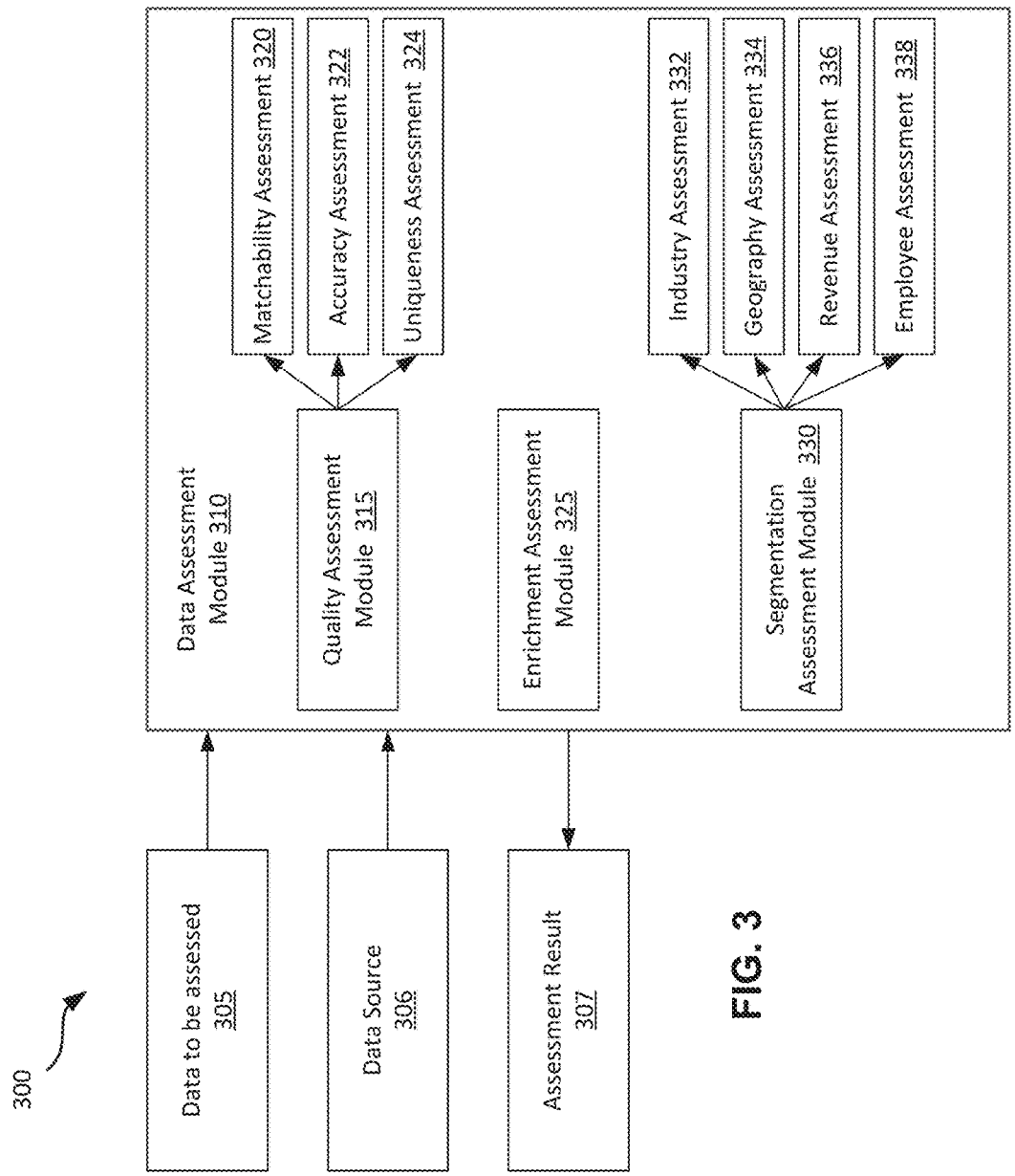
FIG. 3 shows an example diagram of a data assessment module, in accordance with some embodiments.

FIG. 3 shows an example diagram of a data assessment module, in accordance with some embodiments. Diagram 300 is shown to include data assessment module 310 configured to receive the data 305, perform the assessment of the data 305 based on the data source 306, and generate an assessment result 307. The data assessment module 310 may be part of the data assessment application 258 (shown in FIG. 2). For some embodiments, the data 305 may be associated with a CRM and may include multiple records. For example, the data 305 may include account records related to customer account data. For some embodiments, the data assessment module 310 may be configured to include a quality assessment module 315, an enrichment assessment module 325, and a segmentation assessment module 330.

The quality assessment module 315 may be configured to assess the overall quality or health of the data 305 based on the data source 306. There may be different quality categories. For some embodiments, the quality categories may include matchability, accuracy and uniqueness. As shown in FIG. 3, the quality assessment module 315 may include matchability assessment module 320, accuracy assessment module 322 and uniqueness assessment module 324. The matchability assessment module 320 may be configured to determine how easy it is for the data 305 to be kept up-to-date and complete when assessing based on the data source 306. The accuracy assessment module 322 may be configured to determine how much of the data 305 is accurate and up-to-date based on the data source 306. The accuracy may be presented, for example, as a percentage. The uniqueness assessment module 326 may be configured to determine duplicates that may exist in the data 305 from those that match with the data source 306. For some embodiments, the quality assessment module 315 may be configured to determine a summary of the percentages of matched and up-to-date records, matched and outdated records, and unmatched records. For example, the matched and up-to-date records may be presented as a percentage of the records with all fields that match the fields of the data source 306. The matched and outdated records may be presented as a percentage of records with some fields different from the fields of the data source 306. The unmatched records may be presented as a percentage of records that do not match with records of the data source 306.

The enrichment assessment module 325 may be configured to assess at least a subset of the data 305 and may indicate how much better the subset of the data may be when the subset of data is enriched with the information included in the data source 306. Enrichment assessment, for example, may include assessing outdated information, up-to-date information, and updated information. Enrichment assessment may also include assessing blank fields in the subset of data that can be filled with information included in the data source 306. The enrichment assessment may be performed on the subset of the data 305 to help the administrator to have a view of the health of the data 305 as compared to the data source 306 and to decide whether to engage in an enrichment service. The enrichment service may be offered as a paid service, while the enrichment assessment may be offered as a free service.

The segmentation assessment module 330 may be configured to group or bucket the data 305 according to different segments. For some embodiments, the different segments may include industry segment, geography segment, employee count segment and annual revenue segment. As shown in FIG. 3, the segmentation assessment module 330 may include industry assessment module 332, geography assessment module 334, annual revenue assessment module 336, and employee count assessment module 338. The industry assessment module 332 may be configured to identify the number of accounts in, for example, the top five industries from the data 305. The geography assessment module 334 may be configured to identify the number of accounts in different geographic regions from the data 305. There may be multiple geographic regions. The annual revenue assessment module 336 may be configured to identify a number of accounts that have certain annual revenue from the data 305. There may be multiple ranges of annual revenue. The employee count assessment module 338 may be configured to identify a number of accounts that have a certain number of employees from the data 305. There may be multiple ranges of employee counts. The result of the segmentation assessment module 330 may be included in the assessment report 307 using graphical representation. For example, the industry segmentation information may be presented using a bar chart, and the annual revenue segmentation information may be presented using a pie chart. For some embodiments, the data assessment performed on the data 305 may only be used for the purpose of generating the assessment report and may not modify the data 305. For some embodiments, the assessment may be performed as a low priority operation compared to other paid services. For example, the assessment may be performed as a Linux cron job scheduled to run at an off-peak time.

FIG. 4 is a diagram that shows an example of a data source, in accordance with some embodiments. The data source 306 used to perform the data assessment may include data provided by different data providers. As shown in FIG. 4, the data source 306 may include data provided by the data providers 401-403. For some embodiments, the data provided by each of the data providers may have some specific coverage such that the combination of the data provided by all the data providers enables the data source 306 to be a source of truth for data assessment purposes. For example, the data source 306 may be used to assess geographic information such as billing address information, shipping address information, and mailing address information. As another example, the data source 306 may be used to assess companies for lead information such as revenue information, employee count information and industry information. For some embodiment, each of the data providers may have a set of rules associated with its data, and a data assessment performed based on the data provided by a data provider may need to comply with those rules. For example, a rule may specify the type of record (e.g., account) and the matching field (e.g., billing address). One or more rules may be selected when a data assessment is requested. For example, an administrator may select the rules to assess the CRM objects (also referred to as a business object) that include the account records and the lead records, and assessing those records may include assessing addresses or geographic information included in those records.

Figure 5A:
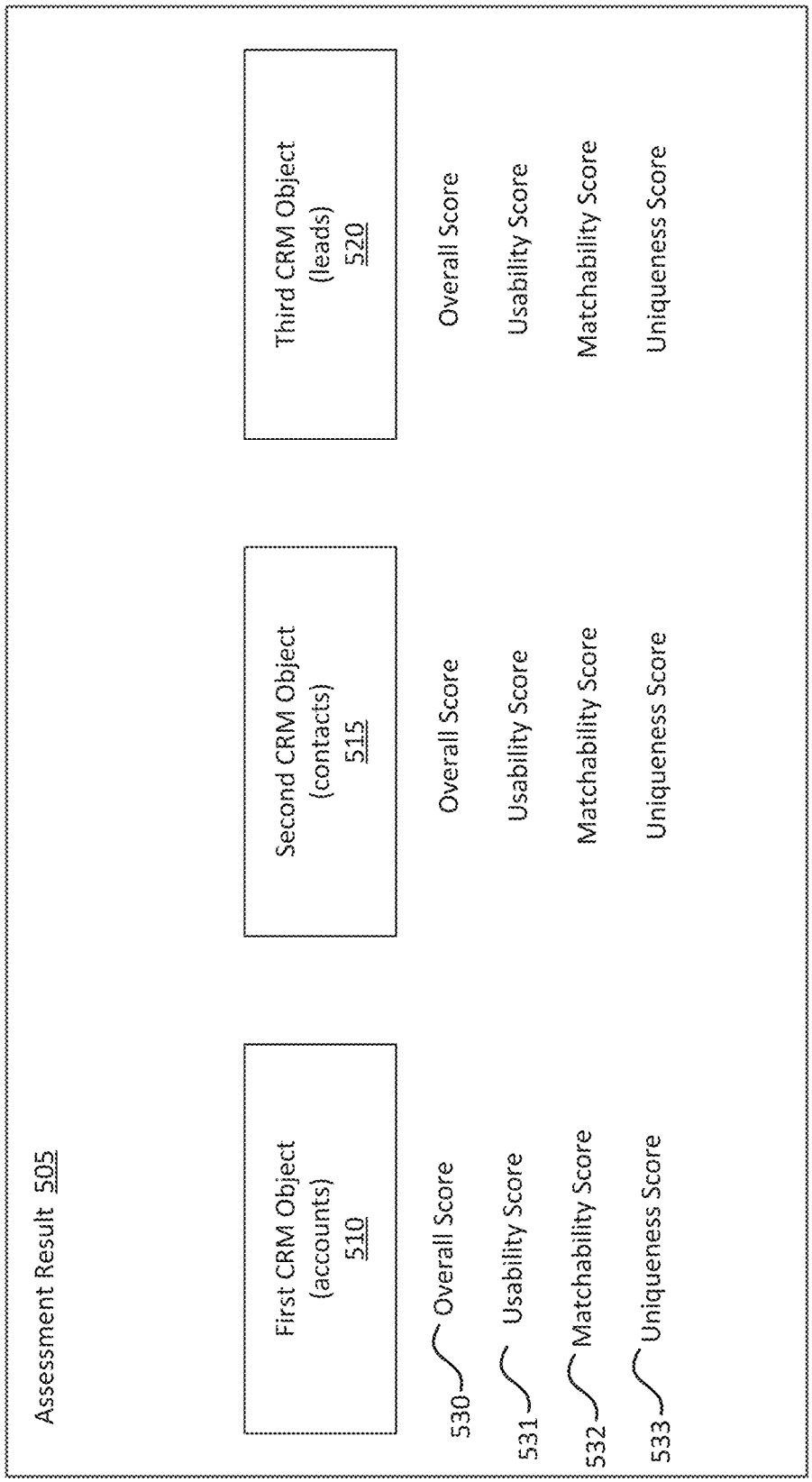
FIG. 5A shows an example assessment result that includes quality assessment information, in accordance with some embodiments.

FIG. 5A shows an example assessment result that includes quality assessment information, in accordance with some embodiments. In this example, the assessment result 505 may include data quality information that corresponds to a CRM object. For example, the first CRM object 510 may correspond to account object, the second CRM object 515 may correspond to contact object, and the third CRM object 520 may correspond to lead object. For some embodiments, for each CRM object, the assessment result 505 may include an overall score 530, a usability score 531, a matchability score 532, and a uniqueness score 533. For example, the overall score 530 may indicate the health of the accounts in the account object. The overall score 530 may range from a poor score at a low end and an excellent score at a high end. The usability score 531 may indicate whether the accounts in the account object are very outdated, moderately outdated, or up-to-date. The matchability score 532 may indicate whether the accounts in the account object are matchable, moderately matchable, or not matchable. The uniqueness score 533 may indicate whether the accounts in the account record include duplicates or does not include any duplicates, based on those accounts that match with the data source 306 (shown in FIG. 3).

Figure 5B:
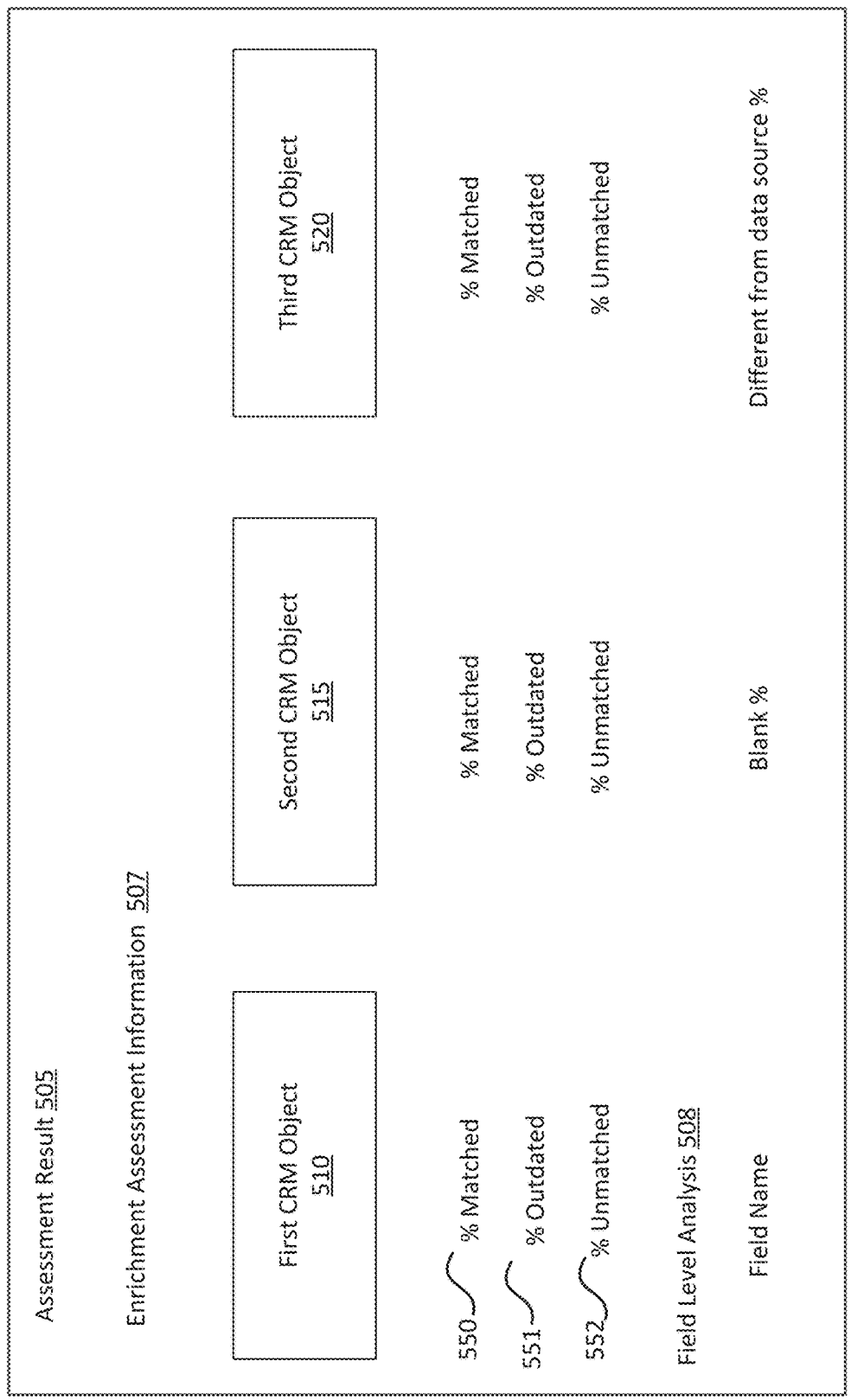
FIG. 5B shows an example assessment result that includes enrichment assessment information, in accordance with some embodiments.

FIG. 5B shows an example assessment result that includes enrichment assessment information, in accordance with some embodiments. The assessment result 505 may include enrichment assessment information 507 for each of the CRM objects 510, 515 and 520. The enrichment assessment information 507 may show how the data 305 may be enriched based on the data source 306. For example, when the first CRM object 510 is the account object, the enrichment assessment information 507 for the records in the account object may include a matched percentage 550, an outdated percentage 551, and an unmatched percentage 552. A graphical representation of the percentage breakdown may be included in the assessment result 505. For some embodiments, the enrichment assessment information 507 may include a field level analysis 508 which analyzes the fields of the records in a CRM object. The field level analysis 508 may list the field name of each field in a record, a percentage of the field that is blank, and a percentage of the fields that do not match with the corresponding field of the data source 306.

Figure 6A:
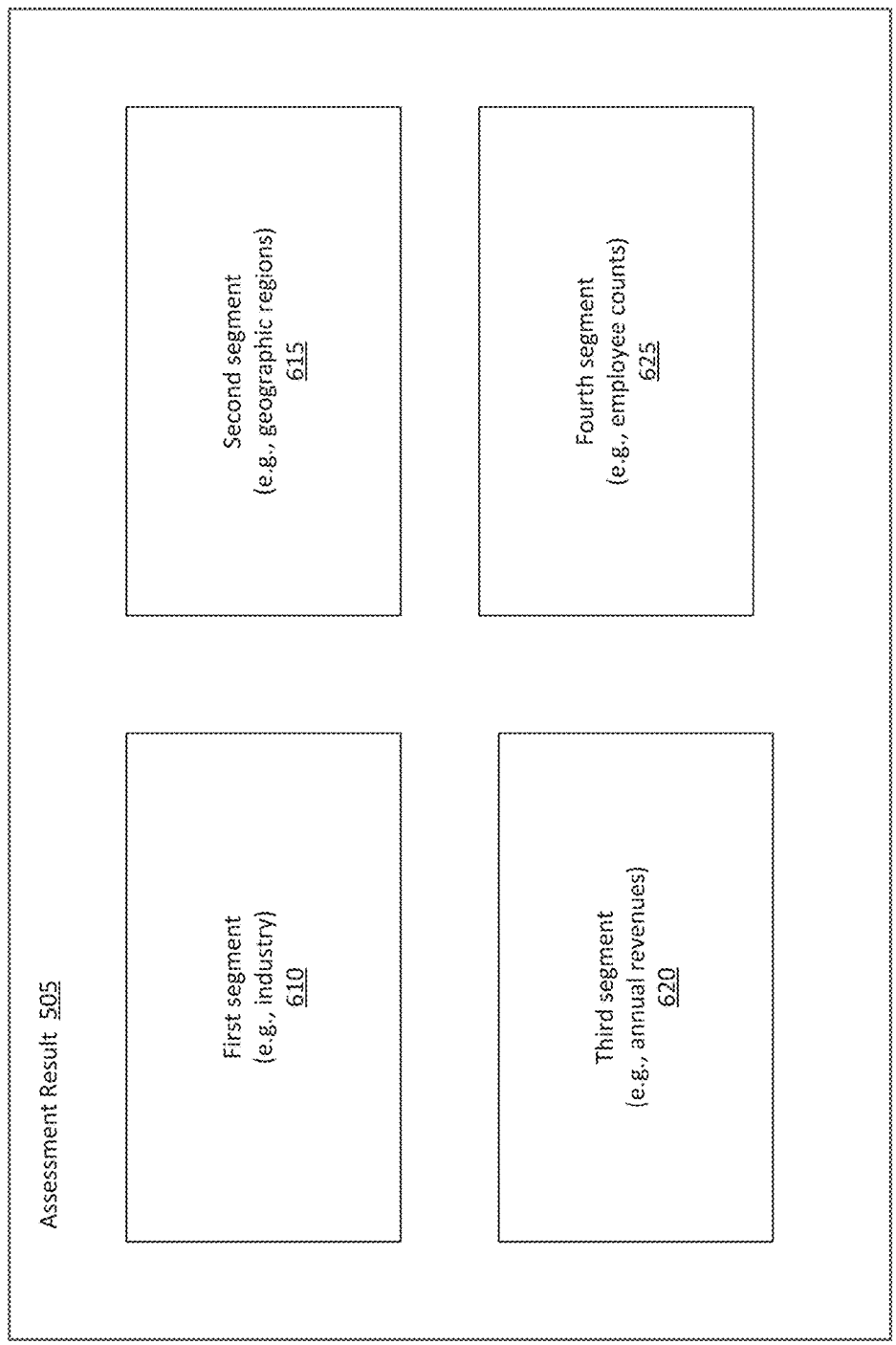
FIG. 6A shows an example assessment result that includes segmentation information, in accordance with some embodiments.

FIG. 6A shows an example assessment result that includes segmentation information, in accordance with some embodiments. The segmentation information may be presented by different segments. For example, the first segment 610 may correspond to the industry segment, the second segment 615 may correspond to the geography segment, the third segment 620 may correspond to the annual revenue segment, and the fourth segment 625 may correspond to the employee count segment. The segmentation information may be presented in graphical representation. For example, the segmentation information for the first segment 610 may include a bar chart showing a breakdown (e.g., top five) of the industries and a number of companies in each of the industries included in the data 305. The segmentation information for the second segment 615 may include a pie chart showing a breakdown of the different regions and a number of companies in each of the regions included in the data 305. The segmentation information for the third segment 620 may include a pie chart showing a breakdown of the different annual revenue ranges and a number of companies in each of the revenue range included in the data 305. The segmentation information for the fourth segment 625 may include a pie chart showing a breakdown of the different employee count ranges and a number of companies in each of the employee count range included in the data 305.

As described with FIG. 2 and FIG. 3, the data 305 that is to be assessed may be stored in the database 270, and the service of the data assessment module 310 may be provided as a free service to an administrator to enable the administrator to determine the health and the potential improvement of the data 305. When there are thousands of customers and millions of records in a complex environment such as a multi-tenancy environment, a system that offers the free assessment service to the customers may be overloaded with data assessment operations. This can potentially deprive the server computing system 255 of resources that are required by other services (e.g., paid services). It may be desirable that the database 270 is architected to enable the data assessment module 310 to perform fast reading operations (e.g., reading of the data 305) while the writing operations (e.g., writing of the assessment result 307) may not have to be as fast. For some embodiments, the database 270 may be architected as a non-relational distributed database. One example of a non-relational distributed database is Hbase developed as part of Apache Software Foundation's Apache Hadoop project and runs on top of HDFS (Hadoop Distributed File System), providing bigtable-like capabilities for Hadoop.

For some embodiments, the database 270 and the data assessment application 258 may be configured to be hosted by a dedicated instance of a multi-tenant cloud. For example, the database 270 and the data assessment application 258 may be hosted by Salesforce Superpod, a dedicated instance in the Salesforce multi-tenant cloud. Salesforce Superpod is a product of Salesforce of San Francisco, Calif. This may enable fast and secured connection between the data assessment application 258 to the database 270 based on using internal authentication scheme.

Figure 6B:
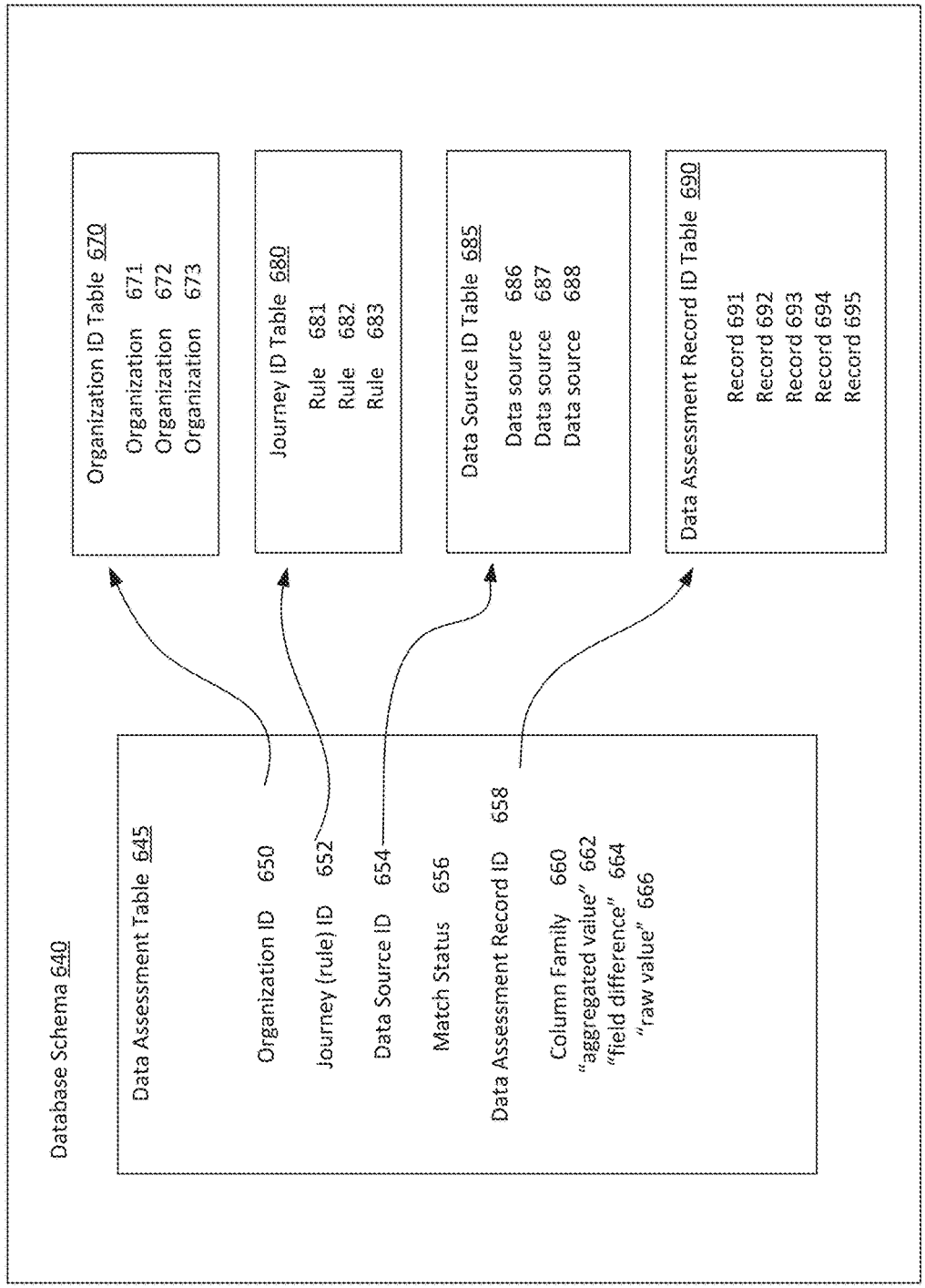
FIG. 6B shows an example database schema that may be used for data assessment, in accordance with some embodiments.

FIG. 6B is a block diagram showing an example database schema that may be used for data assessment, in accordance with some embodiments. The database 270 may be associated with the database schema 640. For some embodiments, the database schema 640 may only be accessible by the data assessment application 258 and any application that may reside in the same secured environment that hosts the database assessment application 258. No access to the database schema 640 from outside of the secured environment may be allowed.

The database schema 640 may include a group of tables. This may include an organization identification (ID) table 670 configured to include information about different organizations organized based on the organization ID. The organization ID table 670 is shown in this example to include three organizations 671 to 673. The database schema 640 may include a journey ID table 680 configured to include information about different rules that may be used by the data assessment application 258 to assess the data 305. The journey (or rule) ID table 680 is shown in this example to include the rules 681 to 683. The database schema 640 may include a data source ID table 685 configured to include information about the different data sources that may be used to assess the data 305. The data source ID table 685 is shown in this example to include the data sources 686-688. The database schema 640 may include a data assessment record ID table 690 configured to include data assessment records associated with the data 305. The data assessment record ID table 690 may include the data assessment records associated with all the organizations that use the data assessment services.

The database schema 640 may also include a data assessment table 645 configured to include at least information related to the following fields: the organization ID field 650, the journey (or rule) ID field 652, the data source ID field 654, the match status field 656, the data assessment record ID field 658 and a column family field 660. The information included in these fields may be part of a data assessment request processed by the data assessment application 258. For some embodiments, since the database 270 is architected as an Hbase database, the read operations are based on the row key definition. As such, the order of the fields (or columns) as shown in FIG. 6B may be relevant to enable the data assessment application 258 to optimize access and aggregation of the data 305. The data assessment table 645 may be configured to use across multiple organizations.

The organization ID field 650 may be configured include information directing to a record in the organization ID table 670. Each organization is associated with a unique organization ID. The data assessment application 258 may compare the organization ID associated with an administrator and the organization ID provided in the data assessment request to ensure that one organization cannot access data associated with another organization.

The position of the organization ID field 650 as a first field of the row key of data assessment table 645 may enable the organization ID to be used for fast scanning of the data associated with a particular organization, especially in a multi-tenant environment where each of the organization is represented by an organization ID.

The journey ID field 652 may be configured to include information directing to a record in the journey ID table 680. Each record in the journey ID table 680 may be a rule. For some embodiments, there may be multiple journey ID fields to enable performing data assessment based on multiple different rules. For example, using a data assessment user interface, an administrator may specify several rule names, with each rule name associated with a journey ID. Different rules may yield different assessment results 307 for the same data 305. For some embodiments, the assessment results 307 may also be stored in the database 270. The position of the journey ID field 652 as a second field of the row key of data assessment table 645 may enable fast aggregation on the basis of the rule associated with the corresponding journey ID. This may help optimize the aggregations for a particular rule for a given organization.

The data source ID field 654 may be configured to include information directing to a record in the data source ID table 685. For some embodiments, there may be multiple data source ID fields to enable performing data assessment based on multiple different data sources. For example, one field (e.g., field1) from the data 305 may be compared with the same field (e.g., datasource1.field1) from the first data source and another field (e.g., field2) from the data 305 may be compared with the same field (e.g., datasource2.field2) from the second data source.

The match status field 656 may be configured to include information indicating a match status of a record. For example, the match status field 656 may be set to a value of "1" when the data assessment application 258 determines that a record of the data 305 matches with a record of the data source and a value of "0" if there is not a match. It may be noted that the value of the match status field 656 may apply to the entire record and not to a particular field of the record. For example, the match status field 656 may be used by the data assessment application 258 to determine a total number of records that can be enriched based on the total number of unmatched records. It may be noted that when the rule indicates that the data assessment is to be performed for a particular field (e.g., phone numbers) of a record, the match status for the entire record may still be determined. The match status may enable fast aggregation operation based on the position of the match status field 656 relative to the organization ID field 650, the journey ID field 652 and the data source ID field 654.

The data assessment record ID field 658 may be configured to include information directing to a record in the data assessment record ID table 690. For example, the data assessment record ID table 690 may include records that are part of the data 305 that is to be assessed by the data assessment application 258. For some embodiments, the data assessment record ID table 690 may be configured so that it can dynamically accommodate the data 305 in different shapes (e.g., size, data types). For example, the data 305 associated with one organization may be represented using ten (10) fields, while the data 305 associated with another organization may be represented using 120 fields with different data types (e.g., character, integer). Thus, the data structure for the data 305 may be different from one organization to the next. The ability for the data assessment record ID table 690 to accommodate different shapes of data may enable an organization to change the shape of its data 305 with minimal impact on the database schema 640. For some embodiments, the data assessment record ID table 690 may be configured to store the enhanced information for those records that are enhanced. Thus, referring to the directional arrows shown in FIG. 6B, a record of the data assessment 645 may include at least an organization ID 650 of the organization that requests for data assessment, a journey ID 652 of the assessment rules for the data assessment application 258 to apply, a data source ID 654 of the data source to compare with, and a data assessment record ID 658 of the record to perform the data assessment on.

The column family field 660 may be configured to include the names of the fields that may be used for aggregation. For some embodiments, the column family field 660 may include three columns. The first column of the column family field 660 may be configured to include aggregated value or "av" for a particular field. For example, the particular field may be a contact phone number field or the company address field. The second column of the column family field 660 may be configured to include raw value or "rv" for a particular field. The third column of the column family field 660 may be configured to include field difference value or "fd" for a particular field. For some embodiments, in order to support a generic model, the name and values of the field associated with the column family field 660 are not defined at schema definition time. Rather, they are defined at run time. This is because the object that may be specified for assessment may have different set of fields and therefore are not known ahead of time at schema definition time. For example, one rule may require the data assessment application 258 to assess the quality of the contact phone numbers in the contact object, while another rule may require the data assessment application 258 to assess the quality of the names of the lead object. For some embodiments, there may be multiple column family fields to assess multiple fields.

Using the column family field 660 may enable the aggregation to be performed on the basis of each column within the column family. For some embodiments, the field "fd" may be configured to include information whether the field is blank, non-blank or whether it matches with the same field in a data source. For some embodiments, the field "av" may be configured to include information about a particular category or bucket that the value in the field belongs to. For example, the field "av" for an address field may include a value "1" when the address is associated with a state in the western U.S, a value "2" if the address is associated with a state in the eastern US, and a value "3" if the address is associated with a state in the central U.S. For some embodiments, the field "rv" may be configured to include the actual or raw value of the field. The content of the "rv" field may be used for consequent re-aggregation or for performing machine intelligence and learning to derive patterns that may help getting a better understanding of the data 305.

It may be noted that the database assessment table 645 may include other fields not shown in FIG. 6B. For some embodiments, the fields shown in FIG. 6B are to be defined in the order shown relative to one another even though there may be other fields in between, starting with the organization ID field 650 as a first field. FIG. 6C shows an example code that may be used to create a data assessment table such as the data assessment table 645 of FIG. 6B, in accordance with some embodiments. As shown with FIG. 6C, code 697 may include other fields in addition to the fields described in FIG. 6B. FIG. 6D shows an example code that may be used to query a data assessment table such as the data assessment table 645 of FIG. 6B, in accordance with some embodiments. The code 698 shown in FIG. 6D may be a dynamic query that is performed on the data assessment table 645. The code 698 is shown to include column family field 699 with a field name "Sic" that is not identified in the column family field of the data assessment table 645. This is because the field "Sic" is defined at run time when the code 698 is issued. As an example, when the query is issued, the field "Sic" may be defined using the following statement: DATA-CLOUD.DATA_ASSESSMENT_RECORD ("av"."Sic" VARCHAR" . . . ).

Figure 7A:
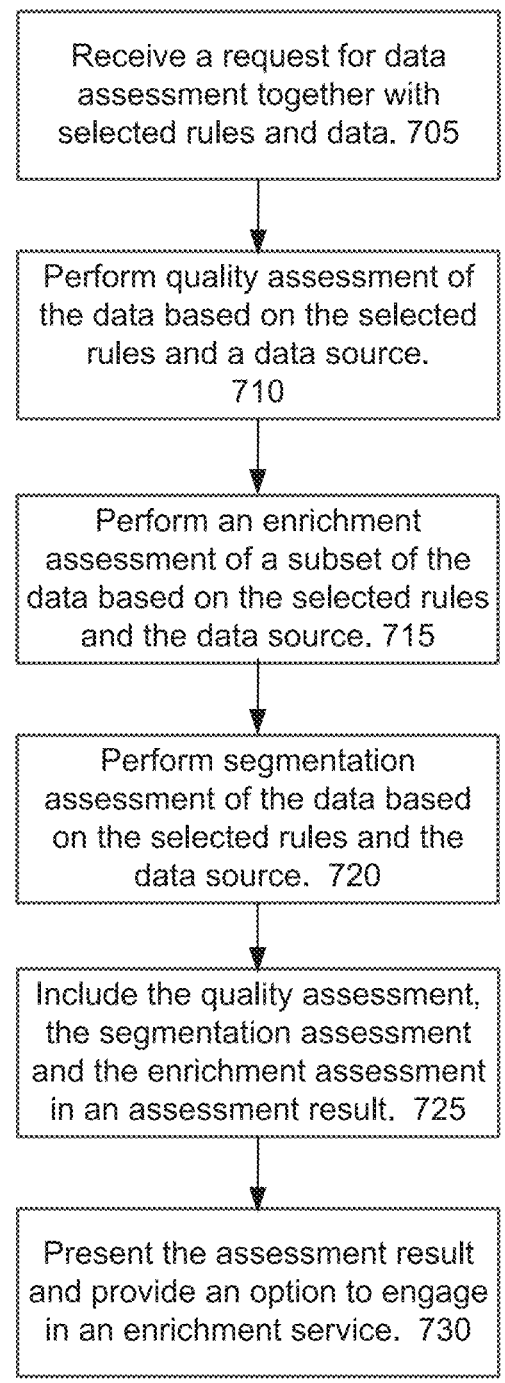
FIG. 7A shows a flowchart of an example process for performing data assessment, in accordance with some embodiments.

FIG. 7A shows a flowchart of an example process for performing data assessment, in accordance with some embodiments. The example process 700 may be used by server computing system configured to perform the data assessment based on a data source that may be associated with data provided by one or more data providers. At block 705, a request for data assessment may be received. The request may be received along with selected rules and the data to be assessed. At block 710, a data quality assessment may be performed on the data based on the selected rules and the data source. This may include, for example, assessing matchability, accuracy and uniqueness. At block 715, an enrichment assessment may be performed on at least a subset of the data based on the selected rules and the data source. This may include, for example, assessing how update the information in the subset of the data is and how many blank fields are in the subset of the data. At block 720, a segmentation assessment may be performed to determine the coverage of the data 305 with respect to different segments including, for example, industries, geographic regions, annual revenue and employee counts. At block 725, the different assessments are included in the assessment result. At block 730, the assessment result may be presented in a graphical user interface along with an option to enable engaging in an enrichment service.

Figure 7B:
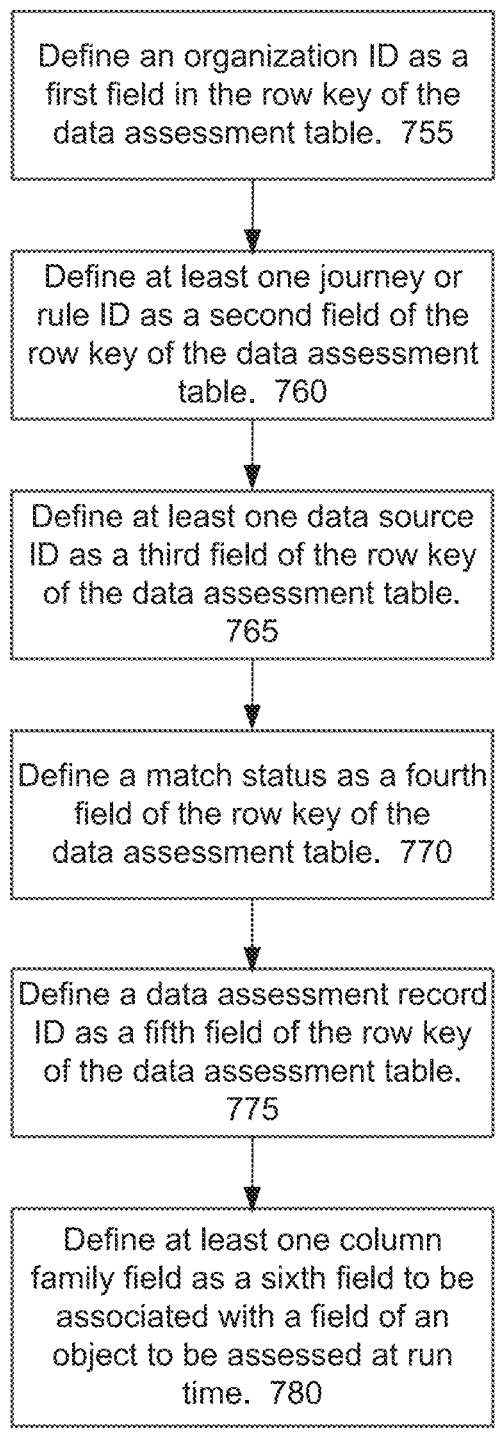
FIG. 7B shows a flowchart of an example process for defining a database schema for data assessment, in accordance with some embodiments.

FIG. 7B shows a flowchart of an example process for defining a data assessment table associated with a database schema, in accordance with some embodiments. The process 750 may start at block 755 where an organization ID field may be defined as a first field of the data assessment table.

At block 760, a rule ID field may be defined as a second field of the data assessment table. There may be more than one rule ID field.

At block 765, a data source ID field may be defined after the clean rule ID field of the data assessment table. There may be more than one data source ID fields. For example, if there is only one rule then the data source ID field is a third field of the data assessment table. Having the data source field as the third field may enable performing fast data aggregation for the same data source. For some embodiments, when the data assessment application 258 does not detect any information in the third field (e.g., the data source field is blank), the data assessment application 258 may be configured to perform classification operations where the records to be assessed may be transformed based on the rule defined by rule ID field.

At block 770, a match status field may be defined after the data source ID field. For example, if there is only one clean rule ID field and one data source ID field, then the match status field is a fourth field of the data assessment table.

At block 775, a data assessment record ID field may be defined after the match status field. For example, the data assessment record ID field may be a fifth field of the data assessment table.

At block 780, a column family field may be defined after the data assessment record ID field. For example, the column family field may be a sixth field of the data assessment table. There may be more than one column family field. As described earlier, the column family field may be associated with a field of a business object. Information about the field of the business object may be identified from the rule associated with the rule ID field.

Figure 8A:
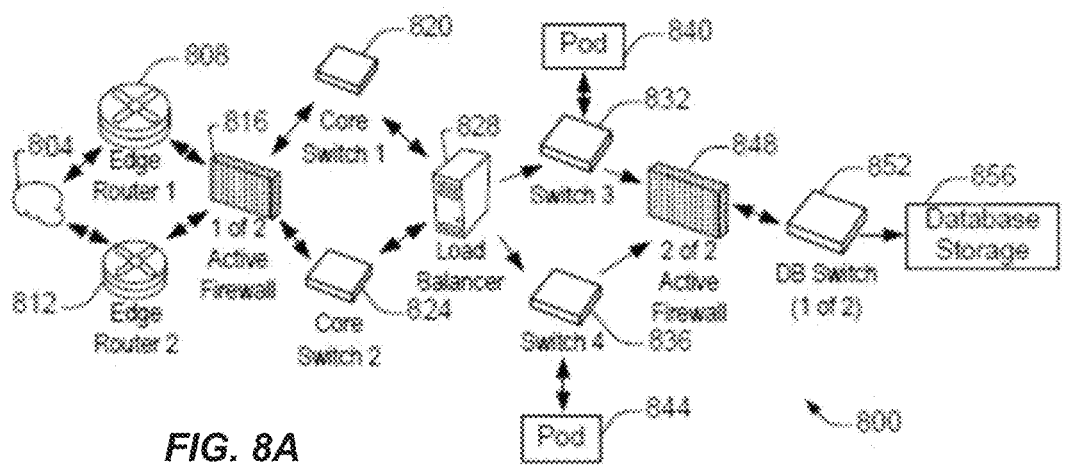
FIG. 8A shows a system diagram illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
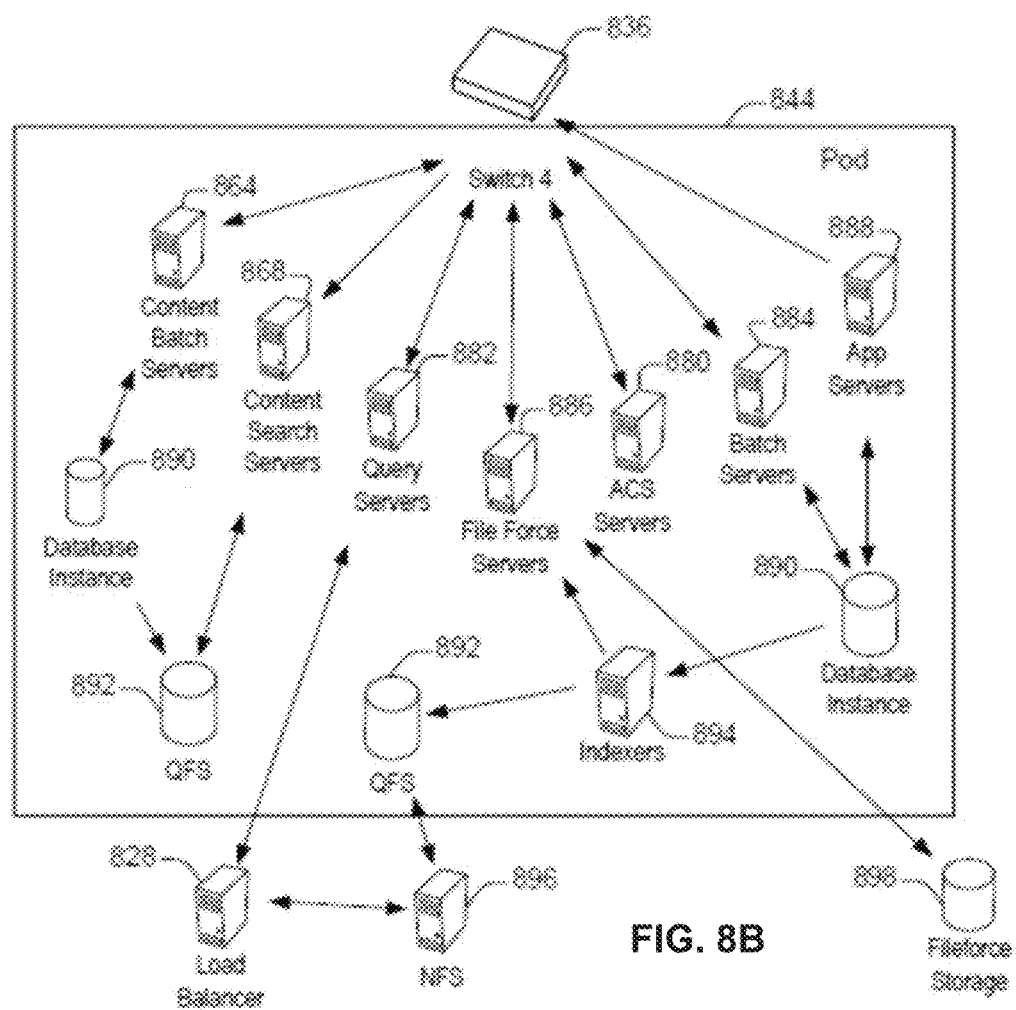
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. For some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
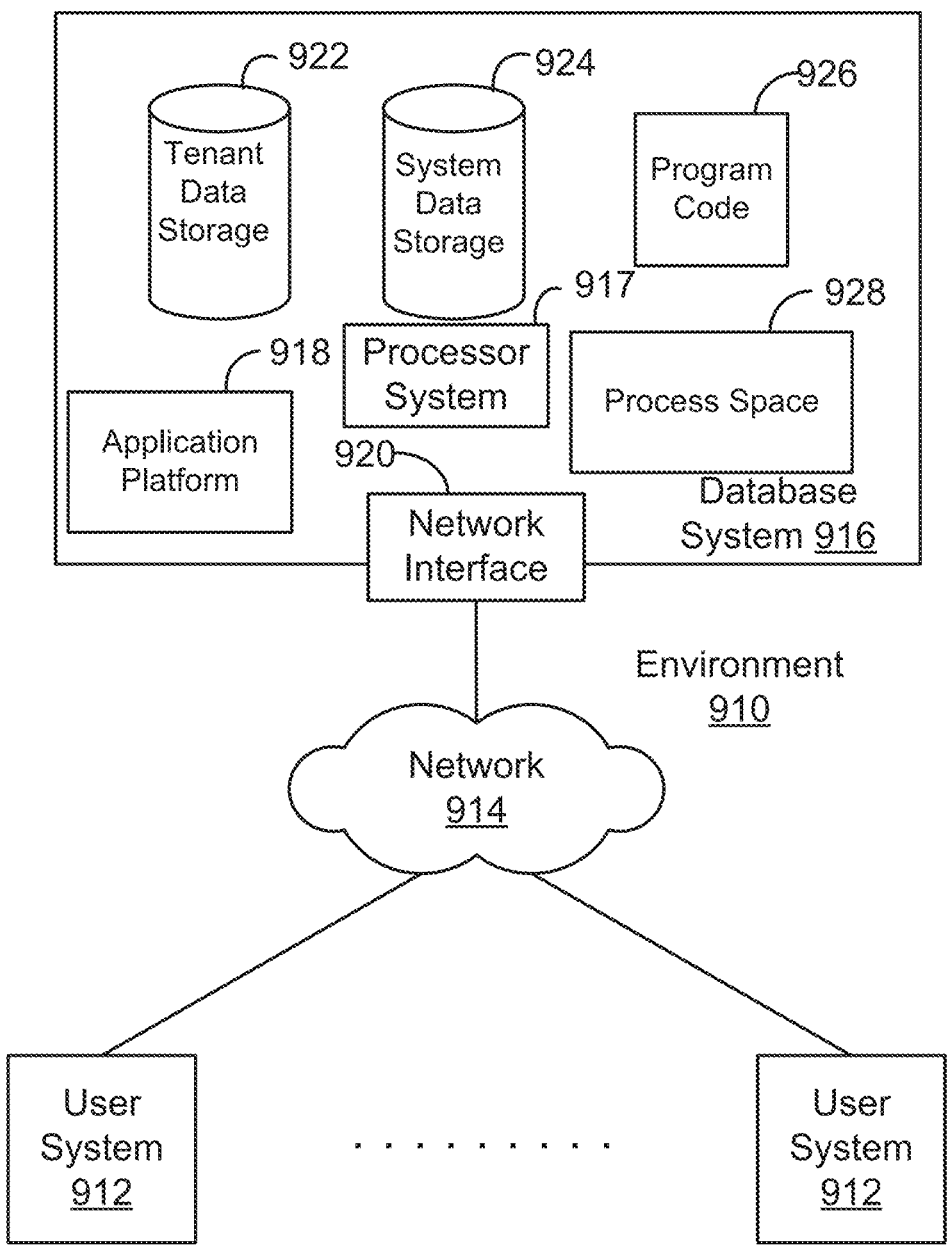
FIG. 9 shows a system diagram illustrating the architecture of a multi-tenant database environment, in accordance with some embodiments.
Figure 10:
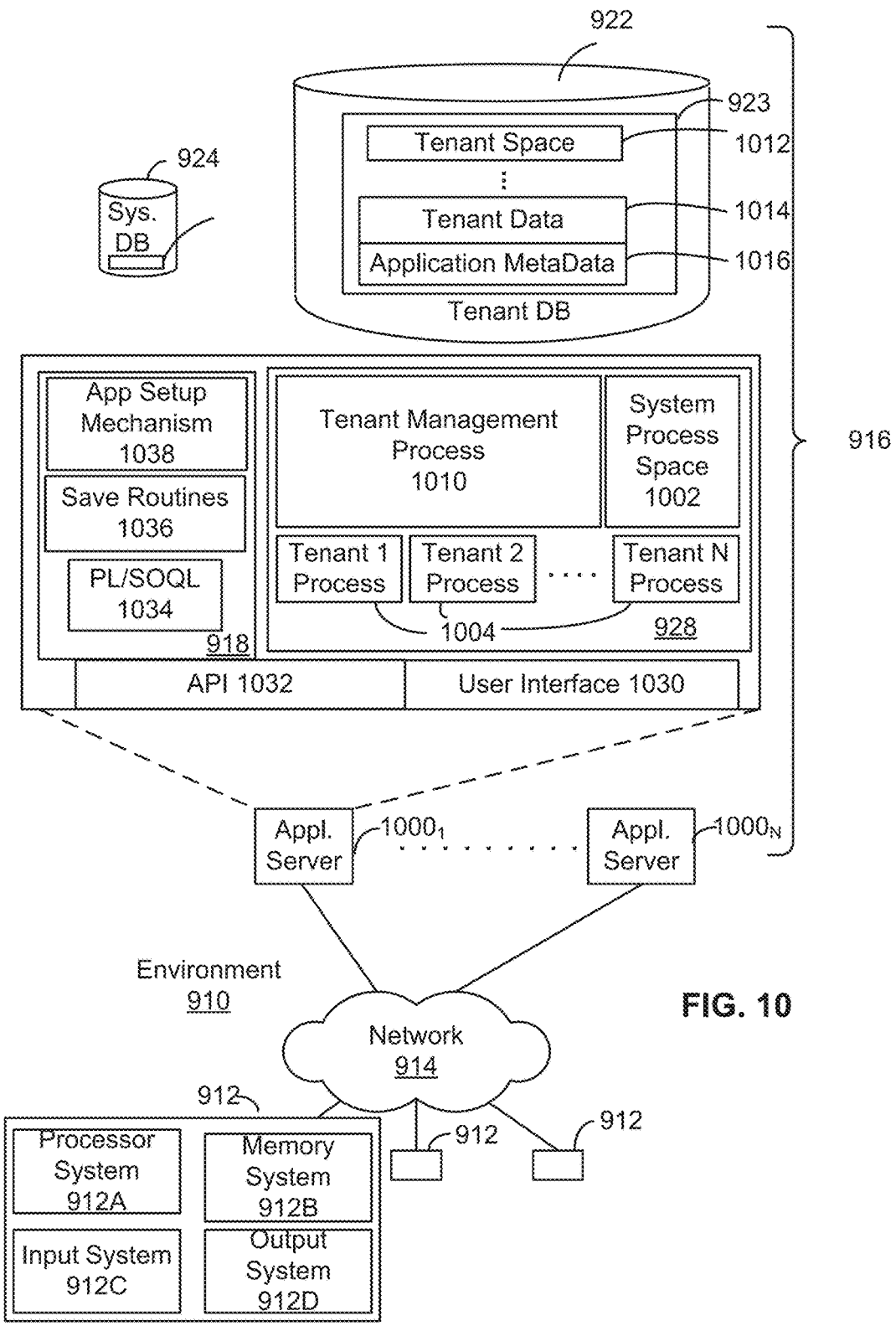
FIG. 10 shows a system diagram further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 4007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TEN-ANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A method comprising:
    creating, by a computing system, a database schema associated with a non-relational distributed database, the database schema representing a data assessment table, an organization identifications (ID) table, a rule ID table, a data source ID table, and a data assessment ID table, the data assessment table having multiple fields, the multiple fields comprising:

a first field representing an organization ID and corresponding to a record in the organization ID table;

at least one second field representing a rule ID and corresponding to a record in the rule ID table, each record in the rule ID table being associated with a business object and indicating a rule to be used by a data assessment application;

at least one third field representing a data source ID and corresponding to a record in the data source ID table, each record in the data source ID table identifying a data source;

a fourth field representing a match status to indicate whether a record in the data assessment ID table matches a record of a data source associated with the third field;

a fifth field representing a data assessment record ID and corresponding to a record in the data assessment record ID table, each record in the data assessment record ID table being a record to be assessed; and at least one sixth field configured as a column family and representing a field of the business object to be determined at run time by the data assessment application;

assessing, by the data assessment application, the data using the database schema and one or more data sources.

2. The method of claim 1, wherein the data assessment table is configurable to include the multiple fields in a specific order.

3. The method of claim 1, wherein each record in the organization ID table is configured to represent a unique organization of multiple organizations in a multi-tenant environment, and wherein the first field of the data assessment table is used to prevent data associated with one organization to be accessible by another organization.

4. The method of claim 3, wherein the non-relational distributed database is Hbase database.

5. The method of claim 4, wherein the at least one second field representing the rule ID comprises a first rule ID and a second rule ID, and wherein the data assessment application is configured to use the first rule ID to perform data assessment on a record in the data assessment record ID table and to use the second rule ID to perform data assessment on the same record in the data assessment record ID table.

6. The method of claim 5, wherein the at least one third field representing the data source ID comprises a first data source ID and a second data source ID, and wherein the data assessment application is configured to use the first data source ID to perform data assessment on a first field of a record in the data assessment record ID table and to use the second data source ID to perform data assessment on a second field of the same record in the data assessment record ID table.

7. The method of claim 6, wherein the data assessment record ID table is configured to accommodate records of different data shapes for different organizations.

8. The method of claim 7, wherein the data assessment record ID table is configured to accommodate changes to a data shape to records associated with an organization.

9. The method of claim 6, where in the at least one sixth field configured as a column family comprises a first column family associated with a first field of the business object and a second column family associated with a second field of the business object.

10. The method of claim 9, wherein the first column family is configured to include at least three columns comprising an aggravated value column, a field difference column, and a raw value column, the aggravated value column configured to store a category value corresponding to one of multiple categories associated with the first field of the business object, the field difference column configured to indicate whether the first field of the business object is blank, non blank and whether the first field of the business object matches with a corresponding field of a data source, the raw value column configured to store a value of the first field of the business object.

11. The method of claim 1, wherein the data assessment application and the non-relational distributed database are hosted in an environment configured to enable internal authentication scheme between the data assessment application and the non-relational distributed database.

12. An apparatus comprising:
one or more processors; and
a non-transitory computer readable medium storing a plurality of instructions, which when executed, cause the one or more processors to:
create, by a computing system, a database schema associated with a non-relational distributed database, the database schema representing a data assessment table, an organization identifications (ID) table, a rule ID table, a data source ID table, and a data assessment ID table, the data assessment table having multiple fields, the multiple fields comprising:
a first field representing an organization ID and corresponding to a record in the organization ID table;
at least one second field representing a rule ID and corresponding to a record in the rule ID table, each record in the rule ID table being associated with a business object and indicating a rule to be used by a data assessment application;
at least one third field representing a data source ID and corresponding to a record in the data source ID table, each record in the data source ID table identifying a data source;
a fourth field representing a match status to indicate whether a record in the data assessment ID table matches a record of a data source associated with the third field;
a fifth field representing a data assessment record ID and corresponding to a record in the data assessment record ID table, each record in the data assessment record ID table being a record to be assessed; and
at least one sixth field configured as a column family and representing a field of the business object to be determined at run time by the data assessment application;
assessing, by the data assessment application, the data using the database schema and one or more data sources.

13. The apparatus of claim 12, wherein the data assessment table is configurable to include the multiple fields in a specific order.

14. The apparatus of claim 12, wherein each record in the organization ID table is configured to represent a unique organization of multiple organizations in a multi-tenant environment, and wherein the first field of the data assessment table is used to prevent data associated with one organization to be accessible by another organization.

15. The apparatus of claim 14, wherein the non-relational distributed database is Hbase database.

16. The apparatus of claim 15, wherein the at least one second field representing the rule ID comprises a first rule ID and a second rule ID, and wherein the data assessment application is configured to use the first rule ID to perform data assessment on a record in the data assessment record ID table and to use the second rule ID to perform data assessment on the same record in the data assessment record ID table.

17. The apparatus of claim 16, wherein the at least one third field representing the data source ID comprises a first data source ID and a second data source ID, and wherein the data assessment application is configured to use the first data source ID to perform data assessment on a first field of a record in the data assessment record ID table and to use the second data source ID to perform data assessment on a second field of the same record in the data assessment record ID table.

18. The apparatus of claim 17, wherein the data assessment record ID table is configured to accommodate records of different data shapes for different organizations.

19. The apparatus of claim 18, wherein the data assessment record ID table is configured to accommodate changes to a data shape to records associated with an organization.

20. The apparatus of claim 17, where in the at least one sixth field configured as a column family comprises a first column family associated with a first field of the business object and a second column family associated with a second field of the business object.

21. The apparatus of claim 20, wherein the first column family is configured to include at least three columns comprising an aggravated value column, a field difference column, and a raw value column, the aggravated value column configured to store a category value corresponding to one of multiple categories associated with the first field of the business object, the field difference column configured to indicate whether the first field of the business object is blank, non blank and whether the first field of the business object matches with a corresponding field of a data source, the raw value column configured to store a value of the first field of the business object.

22. The apparatus of claim 12, wherein the data assessment application and the non-relational distributed database are hosted in an environment configured to enable internal authentication scheme between the data assessment application and the non-relational distributed database.

23. A computer program product comprising computer-readable program code to be executed by one or more processors when retrieved from a non-transitory computer-readable medium, the program code including instructions to:
  create, by a computing system, a database schema associated with a non-relational distributed database, the database schema representing a data assessment table, an organization identifications (ID) table, a rule ID table, a data source ID table, and a data assessment ID table, the data assessment table having multiple fields, the multiple fields comprising:
    a first field representing an organization ID and corresponding to a record in the organization ID table;
    at least one second field representing a rule ID and corresponding to a record in the rule ID table, each record in the rule ID table being associated with a business object and indicating a rule to be used by a data assessment application;
    at least one third field representing a data source ID and corresponding to a record in the data source ID table, each record in the data source ID table identifying a data source;
    a fourth field representing a match status to indicate whether a record in the data assessment ID table matches a record of a data source associated with the third field;
    a fifth field representing a data assessment record ID and corresponding to a record in the data assessment record ID table, each record in the data assessment record ID table being a record to be assessed; and
    at least one sixth field configured as a column family and representing a field of the business object to be determined at run time by the data assessment application;
  assessing, by the data assessment application, the data using the database schema and one or more data sources.

24. The computer program product of claim 23, wherein the data assessment table is configurable to include the multiple fields in a specific order.

25. The computer program product of claim 23, wherein each record in the organization ID table is configured to represent a unique organization of multiple organizations in a multi-tenant environment, and wherein the first field of the data assessment table is used to prevent data associated with one organization to be accessible by another organization.

26. The computer program product of claim 25, wherein the non-relational distributed database is Hbase database.

27. The computer program product of claim 26, wherein the at least one second field representing the rule ID comprises a first rule ID and a second rule ID, and wherein the data assessment application is configured to use the first rule ID to perform data assessment on a record in the data assessment record ID table and to use the second rule ID to perform data assessment on the same record in the data assessment record ID table.

28. The computer program product of claim 27, wherein the at least one third field representing the data source ID comprises a first data source ID and a second data source ID, and wherein the data assessment application is configured to use the first data source ID to perform data assessment on a first field of a record in the data assessment record ID table and to use the second data source ID to perform data assessment on a second field of the same record in the data assessment record ID table.

29. The computer program product of claim 28, wherein the data assessment record ID table is configured to accommodate records of different data shapes for different organizations.

30. The computer program product of claim 29, wherein the data assessment record ID table is configured to accommodate changes to a data shape to records associated with an organization.

31. The computer program product of claim 28, where in the at least one sixth field configured as a column family comprises a first column family associated with a first field of the business object and a second column family associated with a second field of the business object.

32. The computer program product of claim 31, wherein the first column family is configured to include at least three columns comprising an aggravated value column, a field difference column, and a raw value column, the aggravated value column configured to store a category value corresponding to one of multiple categories associated with the first field of the business object, the field difference column configured to indicate whether the first field of the business object is blank, non blank and whether the first field of the business object matches with a corresponding field of a data source, the raw value column configured to store a value of the first field of the business object.

33. The computer program product of claim 23, wherein the data assessment application and the non-relational distributed database are hosted in an environment configured to enable internal authentication scheme between the data assessment application and the non-relational distributed database.

\* \* \* \* \*